(No Model.) 2 Sheets—Sheet 1.

G. H. WILLIAMS.
HOSE REEL.

No. 580,823. Patented Apr. 13, 1897.

Witnesses
F. T. Johnson.
Alfred T. Townsend.

Inventor
George H. Williams
by Hazard & Townsend
his attys (No Model.)  G. H. WILLIAMS.  2 Sheets—Sheet 2.
HOSE REEL.
No. 580,823.  Patented Apr. 13, 1897.
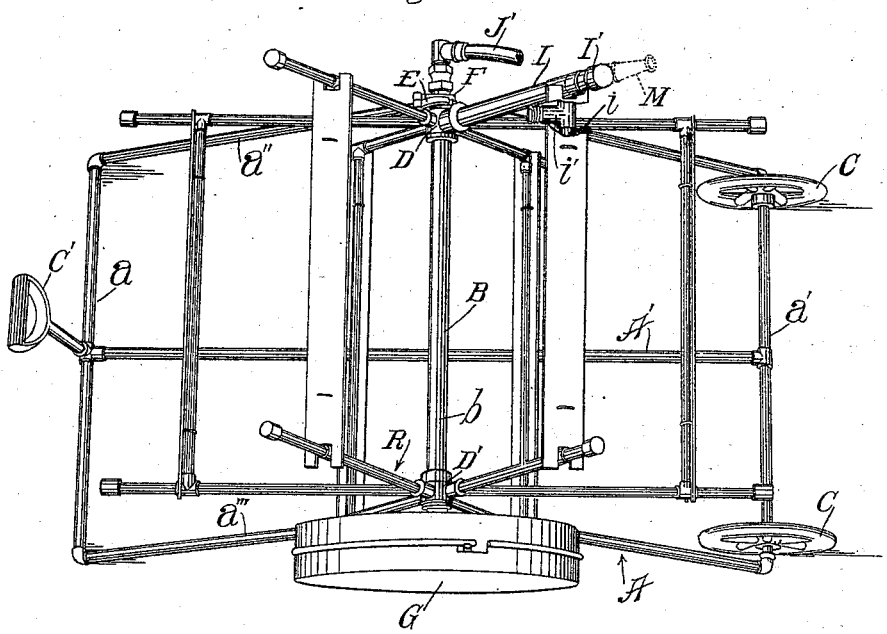
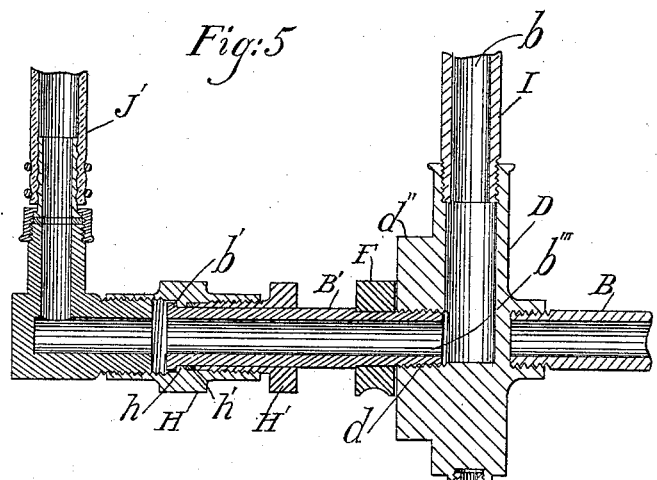
Witnesses:
F. T. Johnson.
Alfred Townsend.
Inventor:
George H. Williams
by Hazard & Townsend
his attys

UNITED STATES PATENT OFFICE.

GEORGE H. WILLIAMS, OF LOS ANGELES, CALIFORNIA, ASSIGNOR OF ONE-HALF TO WILLIAM H. EDWARDS, OF SAME PLACE.

HOSE-REEL.

SPECIFICATION forming part of Letters Patent No. 580,823, dated April 13, 1897.

Application filed September 22, 1896. Serial No. 606,679. (No model.)

*To all whom it may concern:*

Be it known that I, GEORGE H. WILLIAMS, a citizen of the United States, residing at Los Angeles, in the county of Los Angeles and State of California, have invented new and useful Improvements in Hose-Reels, of which the following is a specification.

My invention relates particularly to that class of reels upon which is reeled garden-hose when not in use.

My invention is especially adapted for any hose-reel upon which is wound a stiff non-collapsible hose, but it may be employed to advantage with collapsible hose in which the length of hose reeled is not too great.

One object of my invention is to provide a hose-reel which may be wheeled near a hydrant, attached thereto, and as much hose as is required for use unwound from the reel while the water is flowing through the hose, and when it is desired to again wind up the hose by simply releasing the dog the reel will be automatically revolved and will wind the hose thereupon. Then the reel may be disconnected from the hydrant and wheeled to the place of storage.

Another object of my invention is to provide a device of this kind in which the hose-reel may be used as a sprinkler-stand, if desired, and as such may be wheeled to any place desired, and by partially rotating the reel the spray can be directed in any required direction.

My invention comprises the various features of construction and combinations of parts whereby I am enabled to provide a neat, cheap, and efficient device of this class, one which is not liable to get out of order and is particularly convenient in operation.

The accompanying drawings illustrate my invention.

Figure 1:
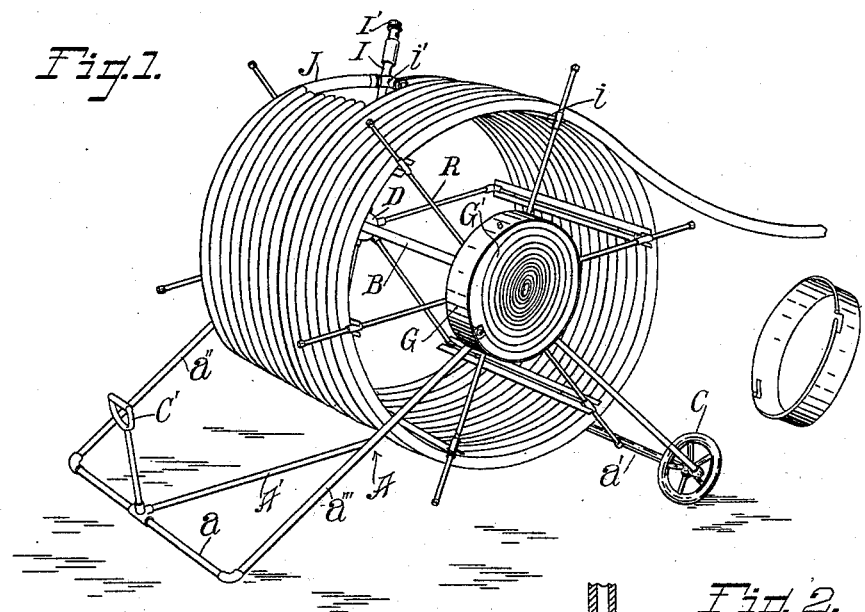
Figure 2:
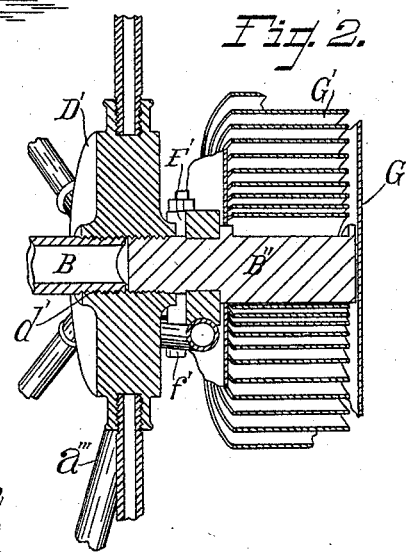
Figure 3:
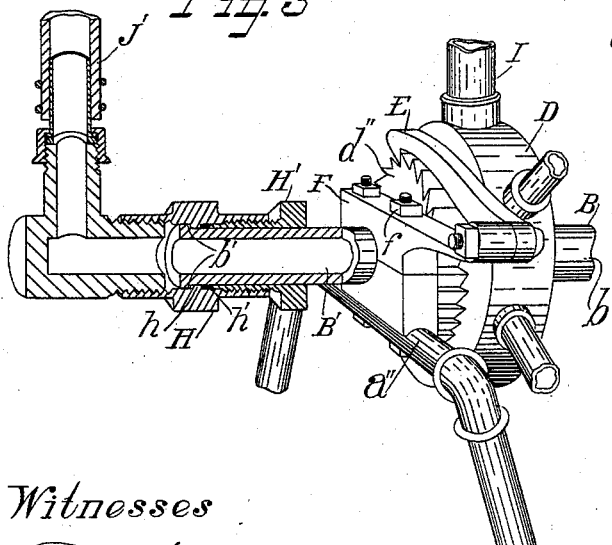

Figure 1 is a perspective side elevation of a hose-reel embodying my invention. In this view a hose is shown wound upon the reel, and the cap which closes the open side of the spring-chamber is removed in order to reveal the construction. A portion of the hose is also broken away to show the connection of the hose with the hollow spoke of the reel. Fig. 2 is a fragmental sectional view of one hub of my device, showing in section the frame, the plug to which is secured the spring, the spring which operates to rotate the reel, and fragments of the spring-case. Fig. 3 is a fragmental perspective view, partly in section, showing the ratchet for controlling the spring and partially illustrating my improved packing-joint, whereby I am enabled to provide a simple and effective water-tight joint which will allow the shaft to revolve with very little friction and with no liability of leakage. Fig. 4 is a plan view showing my improved reel with the hose removed therefrom. Fig. 5 is a sectional view showing the connection between the hollow shaft and the hollow spoke of the reel.

In the drawings, A represents the frame of my improved reel. This frame is composed of two horizontally-arranged parallel side members $a\ a'$ and V-shaped end members $a''\ a'''$, arranged connecting the ends of the side members. These members are inverted, as shown, to form upwardly-projecting supports, upon which is journaled the shaft B of the wheel. A suitable tie or connecting rod A' is arranged connecting the side members $a\ a'$ with each other. As shown, this tie is arranged substantially midway between the ends of the members, and thereby rigidity is secured with little material and small expense.

Upon the member $a'$ I journal suitable supporting-wheels C, and to the member $a$ I attach a handle C' by which the rear end of the reel may be lifted and the reel wheeled upon the supporting-wheels to any place desired.

The supporting-shaft of the reel is preferably formed in sections, the inner section consisting of a length of pipe $b$, screw-threaded at each end. Upon one end of this pipe I screw a cast-metal hub D and on the other end thereof I screw a cast-metal hub D'. The hubs are provided with axially-arranged screw-threaded openings $d\ d'$, respectively. The hub D has a ratchet-wheel $d''$, formed integral therewith, and a dog or pawl E, which is pivotally secured to the journal-box F. It is adapted to engage therewith. Into the outer side of this hub D a short length of pipe B', which is screw-threaded at one end, is screwed and is provided at its outer end with a flange $b'$. Into the outer side of the hub D' is screwed a plug B'', which forms a continuation of the shaft. The pipe B' and the plug B'' are journaled in journal-boxes F F', which are secured to the members $a''$ $a'''$ of the frame by bolts $f f'$, respectively.

G represents a casing which is secured to the frame A and is adapted to chamber and protect a spring G', which has one end secured to the frame or the casing, as may be most convenient, and has its other end secured to the plug B'' and is adapted to be wound thereupon as the hose is unwound from the reel. Upon the length of pipe B' is arranged a sleeve H, which is provided with an inwardly-projecting flange $h$, which is adapted to engage with the flange $b'$ upon the pipe B'. The remainder of the internal diameter of the sleeve is greater than the outside diameter of the pipe B', and a collar H', which is screw-threaded externally, is slipped upon the pipe B' and screwed into the screw-threaded end of the sleeve H. A packing $h'$ is arranged between the flange $h$ and the end of the collar H', so that when such collar is screwed tightly home the packing will be compressed between the end of the collar and the flange $h$. By this construction there is no wear whatever upon the packing excepting that caused by the rotation of the pipe B' as the reel is turned. This wear is inconsiderable, and, by reason of the flange $h$ engaging with the flange $b'$, the easy working of the packed coupling is thereby insured, since metal working against metal has much less friction than metal working against any packing substance heretofore known.

I is a length of pipe screwed into the hub D and communicating with the water-passage $b'''$ through the pipe B'. This pipe forms one of the spokes of the reel R (which, as shown, is formed of pipe) and is provided at its outer end with a removable cap I', and is also provided in line with the cross-bar $i$ or the periphery of the reel with a T-coupling $i'$, which is adapted to have the end of the hose J screwed thereupon, as shown.

To the outer screw-threaded end of the sleeve H is secured a short length of hose J', which is adapted to be attached to the hydrant (not shown) and to thereby supply water to the hose J.

In practice by grasping the handle C' and lifting the reel up until it is supported upon the wheels C it can be easily pushed or pulled to the place desired. Then the pipe J' is connected with a hydrant or other suitable source of water-supply. (Not shown.) The water is turned on and flows through the hose J', the pipe B', the spoke I, and into the hose J, issuing from the nozzle in the ordinary manner. The hose should be non-collapsible, in order to avoid restricting the flow of water therethrough. The operator then grasps the end of the hose and by pulling thereupon unreels as much of the hose as is desired, the spring G' winding upon the shaft as the hose is unwound from the reel, and the dog or pawl engaging with the ratchet-wheel and preventing the reel from rewinding the hose thereupon when the hose is released by the operator. When the ground has been sufficiently sprinkled, if it is desired to drain the hose the hose is all unreeled from the reel and the operator turns off the water at the hydrant, disconnects the hose J' therefrom, thus breaking the seal and allowing the water to drain from the pipe I. Removing the cap I' will serve the same purposes. When fully drained, the operator grasps the unwound portion of the hose J, holding it taut, then releases the dog E, and the spring G' rotates the reel and automatically winds the hose upon the reel, the operator guiding the hose so that it will be wound smoothly and uniformly in place. Then the operator may grasp the handle C' and wheel the hose-reel to the place of storage.

If it is desired to use the reel as a sprinkler-stand, the cap I' may be removed from the outer end of the pipe I, the hose J unscrewed from the T connection $i'$, and the cap screwed upon such connection. Then the hose J may be unreeled from the reel and attached to the hydrant by one end, the other end being secured to the short length of hose J. Then a sprinkler, such as the nozzle M indicated in dotted lines in Fig. 4, is screwed upon the upper end of the spoke I, and the reel is revolved until the sprinkler points in the desired direction, the dog or pawl E engaging with the ratchet-wheel and holding the reel in the required position. Then the water is turned on through the hose J and J' and issues from the nozzle.

The reel may be wheeled into any desired part of the lawn or plot to be sprinkled, the extra long length of hose allowing this to be readily done, and by rotating the reel horizontally and swinging it to one side or the other the spray can be directed over any part of the plot which it is desired to sprinkle.

Now, having described my invention, what I claim as new, and desire to secure by Letters Patent, is—

1. In a hose-reel, the combination set forth of a frame; a shaft; a hub screwed upon each end of the shaft; a plug screwed into the outer side of one of said hubs to form a continuation of the shaft; a pipe screwed into the outer side of the other hub to form a continuation of such shaft; suitable journals secured upon the frame, journaling the shaft; a suitable packing-joint connecting the pipe with a source of water-supply; a hollow spoke screwed into one hub and communicating with the pipe; a reel secured to the hubs; a casing secured to the frame; and a spring secured at one end to the casing and at its other end to the plug and adapted to be wound thereupon as the reel is rotated to unwind the hose therefrom.

2. A hose-reel comprising a frame; a hollow shaft journaled in the frame; a reel secured to the hollow shaft and provided with a hollow spoke communicating therewith; a suitable packing-joint connecting the hollow shaft with a source of water-supply; a hose secured to the hollow spoke and wound upon the reel; a casing secured to the frame; a spring secured at one end to the casing and at its other end to the shaft and adapted to be wound thereupon as the hose is unwound from the reel.

3. The packing-joint set forth comprising a hollow section adapted at one end to be screwed into a coupling, and provided at its other end with a flange; a union-sleeve provided near its mid-length with an inwardly-projecting annular flange adapted to fit upon the hollow section and to engage with the flange thereof, and provided at each end with internal screw-threads; an internally-screw-threaded collar fitted upon the hollow member and screwed into the screw-threaded end of the sleeve; and a packing arranged between the flange of the sleeve and the end of the collar.

4. A hose-reel comprising two hubs, each provided with an axially-arranged screw-threaded opening; a shaft screwed into the openings in the hubs and connecting the hubs with each other; a continuation of the shaft screwed into the outer side of each hub; a reel secured to the hubs; a frame having journal-boxes journaling the shaft; a spring secured at one end to the frame and at the other end to the shaft and adapted to be wound thereupon as the hose is unwound from the reel, and a ratchet arranged to control the reel against the action of the spring.

5. A hose-reel having a hollow shaft; a hollow spoke communicating with the hollow shaft and provided in line with the cross-bar of the reel with a T adapted to have a hose secured thereupon; and a removable cap for the outer end of the hollow spoke.

G. H. WILLIAMS.

Witnesses:
ALFRED I. TOWNSEND,
JAMES R. TOWNSEND.